(12) United States Patent
Kari

(10) Patent No.: US 6,597,682 B1
(45) Date of Patent: Jul. 22, 2003

(54) CHANNEL ALLOCATION METHOD FOR A PACKET NETWORK

(75) Inventor: Hannu Kari, Veikkola (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/194,947
(22) PCT Filed: Jun. 3, 1997
(86) PCT No.: PCT/FI97/00347
  § 371 (c)(1),
  (2), (4) Date: Jul. 14, 1999
(87) PCT Pub. No.: WO97/48249
  PCT Pub. Date: Dec. 18, 1997

(30) Foreign Application Priority Data

Jun. 7, 1996 (FI) .................................................. 962383

(51) Int. Cl.$^7$ ............................................. H04B 7/212
(52) U.S. Cl. ...................... 370/348; 370/329; 370/337; 370/341; 370/468; 455/512
(58) Field of Search .............................. 455/509, 151.1, 455/512, 515; 370/329, 326, 337, 348, 341, 347, 395.21, 395.4, 395.42, 395.43, 465, 468

(56) References Cited

U.S. PATENT DOCUMENTS

| | | | | |
|---|---|---|---|---|
| 4,788,543 A | | 11/1988 | Rubin | 340/825.44 |
| 5,235,598 A | * | 8/1993 | Sasuta | 370/110.1 |
| 5,428,613 A | | 6/1995 | Spiotta et al. | 370/85.7 |
| 5,442,809 A | * | 8/1995 | Diaz et al. | 455/54.1 |
| 5,502,725 A | | 3/1996 | Pohjakallio | 370/94.1 |
| 5,606,561 A | * | 2/1997 | Scheibel, Jr. et al. | 370/347 |
| 5,648,967 A | * | 7/1997 | Schulz | 370/328 |
| 5,752,193 A | * | 5/1998 | Scholefield et al. | 455/452 |
| 5,778,316 A | * | 7/1998 | Persson et al. | 455/434 |
| 5,778,318 A | * | 7/1998 | Talarmo et al. | 455/452 |
| 6,052,369 A | * | 4/2000 | Hamalainen et al. | 370/389 |
| 6,154,648 A | * | 11/2000 | Comer | 455/426 |
| 6,163,697 A | * | 12/2000 | Peterson et al. | 455/450 |
| 6,185,196 B1 | * | 2/2001 | Mademann | 370/327 |
| 6,226,279 B1 | * | 5/2001 | Hansson et al. | 370/329 |

FOREIGN PATENT DOCUMENTS

| | | | |
|---|---|---|---|
| EP | 399 612 | 11/1990 | |
| EP | 615 365 | 9/1994 | |
| EP | 681 406 | 11/1995 | |
| WO | WO 97/09836 | * 9/1995 | H04Q/7/30 |
| WO | 96/08939 | 3/1996 | |
| WO | 97/09836 | 3/1997 | |

OTHER PUBLICATIONS

"Digital cellular telecommunications system (Phase 2+); General Packet Radio Service (GPRS); Service description Stage 1 (GSM 02.60)" ETSI, 1997.
"Digital cellular telecommunications system (Phase 2+); General Packet Radio Service (GPRS); Service description Stage 2(GSM 03.60 version 5.1.0)" ETSI, 1997.

* cited by examiner

*Primary Examiner*—Thanh Cong Le
*Assistant Examiner*—Stephen D'Agosta
(74) *Attorney, Agent, or Firm*—Pillsbury Winthrop LLP

(57) ABSTRACT

A method for allocating a data transmission channel/sub-channel in a telecommunication network. A network includes a telecommunication controller (BTS) and several terminal equipments (MS). The transmission channel is divided into one or more time slots, each of which comprises one or more sub-channels. One or more time slots or sub-channels can be used as a control channel that is further divided into one or more control sub-channels. The terminal equipments (MS) send data in data packets at least on one sub-channel. The telecommunication controller (BTS) sends to the terminal equipments (MS) information about control sub-channels and their allocation situation. Different priorities (P1 to P4) are assigned to the data packets to be sent and to be control sub-channels and their allocation priority of the data packet to be sent and the priority of the control sub-channels, each terminal equipment (MS) determines the moments when it may send a channel request.

18 Claims, 1 Drawing Sheet

CHANNEL ALLOCATION METHOD FOR A PACKET NETWORK

This application is the national phase of international application PCT/F197/00347 filed Jun. 3, 1997 which designated the U.S.

The invention relates to a channel allocation method for a packet network.

Figure 1:
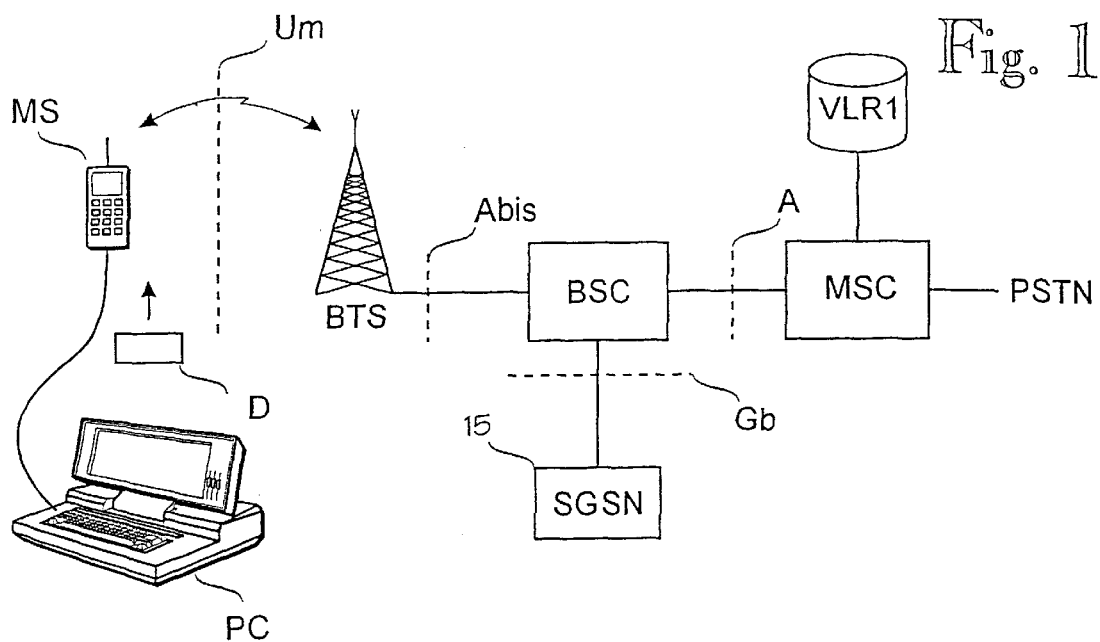

FIG. 1 shows the parts of the packet network essential for understanding the invention. Mobile stations MS communicate with base stations BTSn (Base Transceiver Station) over an air interface Um. Base stations are controlled by base station controllers BSC which are connected to mobile switching centres MSC. The subsystem managed by the base station controller BSC, including the base stations controlled by it, is generally referred to as a base station subsystem BSS. The interface between the centre MSC and the base station subsystem BSS is called an A-interface. The part of the mobile communication system on the side of the MSC at the A-interface is known as a network subsystem NSS. Correspondingly, the interface between the base station controller BSC and the base station BTS is called an Abis-interface. The mobile switching centre MSC attends to the switching of incoming and outgoing calls. It carries out similar tasks as the exchange of the public switched telephone network PSTN. In addition, it carries out functions characteristic of mobile telephone traffic only, such as subscriber location management, in co-operation with network subscriber registers of which a visitor location register VLR1 is shown in FIG. 1.

A conventional radio connection used in digital mobile communication systems is circuit-switched, which means that the radio resources allocated to a subscriber are kept allocated to this connection for the duration of the call. Packet radio service GPRS (General Packet Radio Service) is a new service designed for digital mobile communication systems. The packet radio system GPRS designed for the GSM system is described in ETSI recommendations TC-TR-GSM 02.60 and 03.60. The packet radio service of the American D-AMPS system is called CDPD.

By means of a packet radio service, a user of the mobile station MS can be provided with a radio connection which efficiently utilizes radio resources. In a packet-switched connection radio resources are allocated only when speech or data is to be sent. Speech or data is assembled into packets of a specific length. (The last packet of a message can be shorter than the others.) When such a packet has been sent over the air interface Um and the sending party does not immediately have the next packet to send, the radio resource can be released to the use of other subscribers. The packet radio service is particularly suitable for users of data services. This is illustrated by a computer PC in FIG. 1. The computer PC and the mobile station MS can naturally be integrated into a combined unit. Any terminal equipment can be in place of the mobile station MS.

The system of FIG. 1 includes a separate Serving GPRS Support Node, that is, an SGSN, which controls the operation of the packet data service on the network side. This control includes, for example, registrations of the mobile station to the system and from the system (Logon and Logoff, respectively), updating locations of mobile station and routing data packets to the correct destination. In the context of the present application, "data" broadly interpreted refers to any information which is transmitted in a digital mobile communication system and which, in addition to ordinary data transmission, can include a video signal encoded in a digital form, or telefax data. The SGSN may be located in connection with the base station BTS, the base station controller BSC or the mobile switching centre MSC, or it may be located separately from them. The interface between the SGSN and the base station controller BSC is known as a Gb-interface.

The random access method used in the conventional GSM system is explained for example in Mouly—Pautet: The GSM system for *Mobile Communications,* ISBN 2-9507190-0-7, p. 368 ff. To put it very simply, this random access method broadcasts information about radio channels and their allocation situation. Mobile stations can attempt to reserve a free radio channel. If the base station is successful in decoding exactly one reservation attempt, it responds to the mobile station in question and allocates a radio channel to it. If the mobile station does not get a response, it attempts to reserve again after a random period of time. In a very congested network, it would be possible that most of the reservation attempts would be these re-reservation attempts and only a small portion would be first attempts. In order to avoid this situation, the GSM system has mechanisms for restricting traffic temporarily, such as restricting the number and/or duration of new attempts and closing off one or more access classes. When a radio channel is released, all mobile stations do not automatically attempt to reserve it as this would lead automatically to a congestion in a situation where several mobile stations wait for a radio channel to be released. Instead, the mobile stations determine the probability on which they attempt to reserve at each time slot. The probability may depend on the loading of the base station. This allocation method is known by the general term radio resource allocation.

As in a packet network radio resources can be released after sending of each radio packet, radio resources also have to be allocated separately for the sending of each radio packet. Therefore the packet radio network sets considerably higher demands on the used random access method than a conventional mobile communication system used for speech transmission in which system radio resources are allocated only at the beginning of the call and possibly in connection with a handover.

A partly similar problem as in packet radio networks can be seen in some local area networks, such as Ethernet networks. The solutions of local area networks are not suitable for packet radio networks as all work stations of a local area network are connected to the same cable and they can detect if one work station or more work stations allocate the common resource (in the case of local area network, the network cable). In the packet radio network this is not possible as the mobile station on the side of the cell does not probably hear the transmission of a mobile station on the opposite side of the cell.

A packet radio network can be used in very different applications where speed requirements may vary significantly. For example, International Union of Railways IUR requires that a message of 128 bytes is transmitted in less than 0.5 seconds at the highest priority. Such messages can be used for stopping a train when danger threatens. The transmission of short messages via the packet radio network can be thought to be an example of a less critical application. Short messages can signal an audio message waiting in a voice mail box, for example. Then it is of no great significance if the message was delayed some minutes.

Very different needs can be present even in the same application. For example, when browsing the Internet, it is important that commands of one or a few characters in length are transmitted to the server as fast as possible. On the other hand, response times do not have the same significance in connection with long data transmissions.

The object of the invention is to develop a method for reserving a data transmission channel or its sub-channel in a telecommunication network using radio resource allocation in such a manner that the problems mentioned above can be solved. The objects of the invention are achieved with the method which is characterized by what is stated in claim 1. The dependent claims relate to the preferred embodiments of the invention.

The invention is based on that:
- different priorities are assigned to the data packets to be sent;
- different priorities are also assigned to possible control sub-channels and the telecommunication controller sends to the terminal equipments information about the priorities assigned to control sub-channels;
- on the basis of the priority of the data packet to be sent and the priority of the control sub-channels, each terminal equipment determines the moments when said terminal equipment is allowed to send a channel request.

In the present application, a control sub-channel refers to a channel which the mobile station or some other terminal equipment uses for sending a channel request of a transmission channel. A priority class refers to the terminal equipments or application to the data packets of which the same priority is assigned.

The advantages of the method of the invention are e.g. a good response time for packets with a high priority and equability for each priority class. The specific advantages of the preferred embodiments of the invention appear in connection with the embodiments in question.

Figure 2A:
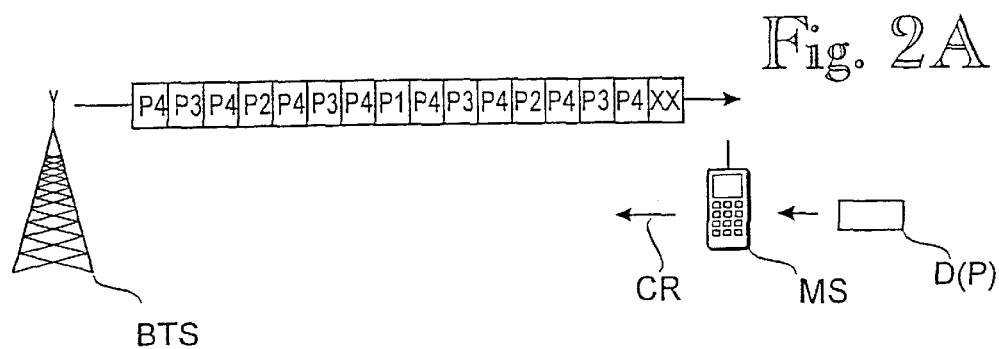
Figure 2B:
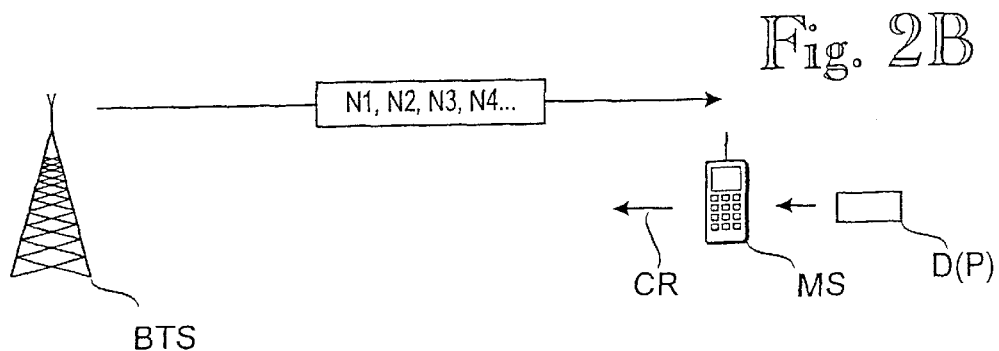

The invention will now be explained in more detail in connection with preferred embodiments, with reference to the appended drawings, wherein FIG. 1 shows the parts of the mobile communication system essential for understanding the invention; and FIGS. 2A and 2B show methods with which the base station can send information about the priorities of control channels to mobile stations.

The primary field of application of the radio resource allocation method of the invention is in connection with a packet radio network. In the case of the exemplary GPRS system, the priority of a data packet is determined on the basis of the quality of service (QoS) of the connection. The quality of service can be negotiated at the beginning of the connection or later during the connection. By changing the priority during the connection, the mobile station MS can utilize situations when a sufficiently good service situation will be attained even with a lower priority.

When the invention is applied to a system where a quality of service QoS as in the GPRS system is not defined, priority can be negotiated separately at the beginning of the connection and/or during it.

According to one embodiment of the invention, a telecommunication controller, such as a base station BTS sends an exact priority definition. This is illustrated in FIG. 2A. In the solution shown in FIG. 2A, the BTS sends in the downlink direction on the control channel information about the priority of each uplink control sub-channel. For example, in the case of four priority levels, every other (8 time slots) of 16 successive time slots can be allocated to a higher priority (P4). Every other (4 time slots) of the remaining time slots is allocated to the second highest priority (P3). In the case of four priority levels, for example, 15 of 16 time slots would be used with this method. Every 16th time slot ("XX" in FIG. 2A) can be assigned to the priority whose average delay in relation to the nominal or maximum delay of this priority is the worst. Alternatively, every 16th time slot can be assigned to a completely different purpose or the sequence of priorities can be repeated after 15 time slots. By spreading the time slots possibly used for allocation—for example so that every other possible time slot is allocated to the highest priority—as little delay as possible is caused for sending of a channel request.

As an alternative to the base station BTS sending the priority explicitly, it can send specific parameters, such as proportions N1 to N4 of the control sub-channels allocated to different priority classes. This is illustrated in FIG. 2B. In this case at the beginning of a certain repeating period of study, a time period corresponding to its proportion is first allocated to a higher priority and after that to the second highest priority, and so on.

According to another alternative, the telecommunication controller may send information about the prevailing load situation, especially about the loading of each priority class. On the basis of this information, the terminal equipments can determine by a specific algorithm what is the probability for it that they attempt to reserve a radio channel. The greater the load of the priority class and the lower the priority of the data packet to be sent, the smaller the probability that the terminal equipment having data to send attempts to reserve a radio channel at a specific moment.

The terminal equipment MS having data to send compares the priority of the data packet to the priority of the control sub-channel and it sends a channel request CR only if the priority P of the data packet is at least as high as the priority Pn of the control sub-channel (n=1, 2, . . . the number of priorities). It may be advantageous to implement a solution where the terminal equipment MS sends a channel request only if the priority P of the data packet is exactly as high as the priority Pn of the control sub-channel. According to this alternative, the terminal equipment does not send a channel request if the priority P of the data packet is higher than the priority Pn of the control sub-channel. Thus unnecessary reservation attempts and collisions caused by them are prevented because a packet with a higher priority can be sent relatively fast in any case.

For the sake of equability and to avoid long waiting times, it is advantageous if the terminal equipment MS increases automatically the priority P of a packet that has had to wait for transmission longer than a certain threshold value. The threshold value may depend on the service class for example so that the terminal equipment compares the time the data packet has waited for its transmission turn with the greatest transmission delay of the packet defined for the service class in question. If the time used for waiting the packet is a significant portion of the maximum delay, the priority of the packet may be raised.

In a reverse case when network loading is small, the terminal equipment may detect that a sufficient service level can also be attained with a lower priority. In this case the terminal equipment can use independently a lower priority than the last negotiated priority.

In a conventional radio resource allocation method, the terminal equipments MS wait in a collision situation a random period of time before a new reservation attempt. In practice, a random period of time is formed by some algorithm producing pseudo-random numbers. In the GSM system, the range of variation of random time can be exponentially increasing so that each successive collision doubles the range of variation of random time. In the method of the invention, the range of variation can also depend on the priority of the control sub-channel or the data packet so that a higher priority has a smaller ranger of variation and also a longer waiting time than lower priorities.

With reference to FIGS. 1 and 2, it is assumed that the cell to be examined has 100 active mobile stations which are divided into three priority classes as follows:

| Priority | Number of mobile stations | Proportion of time slots | Proportion of time slots per mobile station |
| --- | --- | --- | --- |
| 1 (lowest) | 70 | 15% | 0.2% |
| 2 | 25 | 35% | 1.4% |
| 3 (highest) | 5 | 50% | 10% |
| Total | 100 | 100% | 1% |

Mobile stations with the highest priority, that is, of the 3rd priority have the greatest probability to manage to allocate a radio channel as there are only few of these mobile stations. In this example the mobile stations with the highest priority have 10 times greater proportion of time slots per a mobile station than mobile stations on the average (=1%). Correspondingly, mobile stations with a lower priority have 5 times smaller proportion than mobile stations on the average. By pricing different priorities an operator can have an effect on the number of mobile stations on each priority level.

The channel allocation algorithm of the invention is explained by way of example, but not restricting the invention in any way, in connection with the GPRS network. The primary field of application of the radio resource allocation method of the invention is in connection with a packet radio network but it can also be applied in connection with other telecommunication systems, of which local area networks operating on the infrared range and peripheral controllers could be mentioned. Therefore any terminal equipment could be in place of the mobile station MS. The base station BTS could also be similarly generalized into a telecommunication controller. The invention and its embodiments are thus not restricted to the examples described above but they can vary within the scope of the claims.

What is claimed is:

1. A method for allocating sub-channels of a data transmission channel in a telecommunication network using a radio resource allocation method, the network including at least one telecommunication controller and several terminal equipments, the method comprising dividing the data transmission channel into one or more time slots, each of which including one or more sub-channels;

using one or more time slots or sub-channels as a control channel and further dividing the control channel into one or more control sub-channels with which terminal equipment can send a channel request to the data transmission channel;

sending data in data packets on at least one-sub-channel from the terminal equipment;

sending from the telecommunication controller to the terminal equipments information about the control sub-channels and their situation;

assigning different priorities to the data packets to be sent;

assigning different priorities to the control sub-channels and sending from the telecommunication controller to the terminal equipments information about the priorities assigned to the control sub-channels;

based on the priority of the data packet to be sent and the priority of the control sub-channels, each terminal equipment determining the specific moments when said terminal equipment is allowed to send a channel request, and sending, by the terminal equipments, a channel request only if the priority assigned to the data packet is at least as high as the priority assigned to the control sub-channel.

2. The method of claim 1, further comprising negotiating, at least at the beginning of the connection, by the terminal equipment and the remaining portion of the telecommunication network, a priority for the connection and this priority is used for data packets during said connection.

3. The method of claim 2, further comprising negotiating, by the terminal equipment and the remaining portion of the telecommunication network, a priority for the data packets during the connection as well.

4. The method of claim 2, wherein the terminal equipment may also use a lower priority than the last negotiated priority.

5. The method of claim 1, wherein the telecommunication controller sends to the terminal equipment explicitly the priorities assigned to the control sub-channels.

6. The method of claim 1, further comprising the telecommunication controller sending to the terminal equipment a parameter set based on which the terminal equipment determines the priorities assigned to the control sub-channels.

7. The method of claim 1, further comprising the telecommunication controller sending to the terminal equipment information about the loading of each priority class and based on this information determining, by the terminal equipment the priorities assigned to the control sub-channels.

8. The method of claim 1, further comprising a terminal equipment that does not get a response to the channel request from the telecommunication controller resending a channel request after a random period of time, wherein a range of variation of random period of time depends on the priority of the data packet.

9. The method of claim 1, further comprising the terminal equipment raising the priority of the data packet if the data packet has waited for sending longer than a pre-set threshold value.

10. A method for allocating sub-channels of a data transmission channel in a telecommunication network using a radio resource allocation method, the network including at least one telecommunication controller and several terminal equipments, the method comprising:

dividing the data transmission channel into one or more time slots, each of which including one or more sub-channels;

using one or more time slots or sub-channels as a control channel and further dividing the control channel into one or more control sub-channels with which terminal equipment can send a channel request to the data transmission channel;

sending data in data packets on at least one-sub-channel from the terminal equipment;

sending from the telecommunication controller to the terminal equipments information about the control sub-channels and their situation;

assigning different priorities to the data packets to be sent;

assigning different priorities to the control sub-channels and sending from the telecommunication controller to the terminal equipments information about the priorities assigned to the control sub-channels;

based on the priority of the data packet to be sent and the priority of the control sub-channels, each terminal equipment determining the specific moments when said terminal equipment is allowed to send a channel request; and sending, by the terminal equipments, a channel request only if the priority assigned to the data packet is exactly as high as the priority assigned to said control sub-channel.

11. The method of claim 10, further comprising negotiating, at least at the beginning of the connection, by the terminal equipment and the remaining portion of the telecommunication network, a priority for the connection and this priority is used for data packets during said connection.

12. The method of claim 11, further comprising negotiating, by the terminal equipment and the remaining portion of the telecommunication network, a priority for the data packets during the connection as well.

13. The method of claim 11, wherein the terminal equipment may also use a lower priority than the last negotiated priority.

14. The method of claim 10, wherein the telecommunication controller sends to the terminal equipment explicitly the priorities assigned to the control sub-channels.

15. The method of claim 10, further comprising the telecommunication controller sending to the terminal equipment a parameter set based on which the terminal equipment determines the priorities assigned to the control sub-channels.

16. The method of claim 10, further comprising the telecommunication controller sending to the terminal equipment information about the loading of each priority class and based on this information determining, by the terminal equipment the priorities assigned to the control sub-channels.

17. The method of claim 10, further comprising terminal equipment that does not get a response to the channel request from the telecommunication controller resending a channel request after a random period of time, wherein a range of variation of the random period of time depends on the priority of the data packet.

18. The method of claim 10, further comprising the terminal equipment raising the priority of the data packet if the data packet has waited for sending longer then a pre-set threshold value.

* * * * *